(12) United States Patent
Marashdeh et al.

(10) Patent No.: US 12,491,486 B1
(45) Date of Patent: Dec. 9, 2025

(54) RADIATION SHIELDING NANOCOMPOSITE

(71) Applicant: IMAM MOHAMMAD IBN SAUD ISLAMIC UNIVERSITY, Riyadh (SA)

(72) Inventors: Mohammad Wasef Marashdeh, Riyadh (SA); Islam Gamal Ibrahim Ali Alhindawy, Riyadh (SA); Karem Abdelazim Gaber Mahmoud, Riyadh (SA); Mamduh Jamil Aljaafreh, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/817,804

(22) Filed: Aug. 28, 2024

(51) Int. Cl.
*B01J 13/00* (2006.01)
*A61B 6/10* (2006.01)

(52) U.S. Cl.
CPC ........... *B01J 13/0069* (2013.01); *A61B 6/107* (2013.01)

(58) Field of Classification Search
None
See application file for complete search history.

(56) References Cited

U.S. PATENT DOCUMENTS 10,026,513 B2 7/2018 Cardon et al.
2014/0170088 A1 6/2014 Kale et al.

FOREIGN PATENT DOCUMENTS

CN 104900282 B 3/2017
CN 115627087 A 1/2023

OTHER PUBLICATIONS

Wang, et al., "Supporting Tungsten Oxide on Zirconia by Hydrothermal and Impregnation Methods and its Use as a Catalyst to Reduce the Viscosity of Heavy Crude Oil", Sep. 26, 2012, Energy & Fuels, vol. 26, p. 6518-6527. (Year: 2012).*
Bawazeer, et al., "A review on using nanocomposites as shielding materials against ionizing radiation", Mar. 31, 2023, J. Umm Al-Qura Univ. Allpp. Sci., vol. 9, p. 325-340. (Year: 2023).*
Alhindawy, et al., "Zirconium Tungstate (Zr4W8O32)-doped zirconium dioxide (ZrO2) for gamma ray shielding: an in-depth examination of fabrication, characterizations, and gamma ray attenuation properties", Jun. 26, 2024, J Mater Sci, vol. 59, p. 12285-12304. (Year: 2024).*
Críssia C. P. Fontainha, et al., "Radiation shielding with Bi2O3 and ZrO2:Y composites: preparation and characterization", International Nuclear Information System (INIS), vol. 46, Issue 50, Oct. 4-9, 2015, pp. 1-12.

(Continued)

*Primary Examiner* — Kim S. Horger
(74) *Attorney, Agent, or Firm* — Oblon, McClelland, Maier & Neustadt, L.L.P.

(57) ABSTRACT

A nanocomposite includes a zirconia matrix and a metal oxide dispersed in the zirconia matrix and selected from the group consisting of bismuth oxide and tungsten oxide. The nanocomposite is in the form of nanoparticles having an average size of 5-25 nm. A linear attenuation coefficient of the nanocomposite is higher than a linear attenuation coefficient of pure zirconia for gamma-rays having energies of 0.059 MeV to 0.662 MeV. The nanocomposite includes, based on a total weight of the nanocomposite, 40-60 wt. % of Zr, 20-30 wt. % of O, and 20-30 wt. % of Bi or W.

15 Claims, 12 Drawing Sheets

(56) References Cited

OTHER PUBLICATIONS

Linganaboina Srinivasa Rao, et al., "Effect of zirconium oxide nanoparticles on thermal, optical, and radiation shielding properties of Bi2O3-B2O3-MnO2 glasses", Applied Radiation and Isotopes, vol. 205, Mar. 2024, p. 111183 (9 pgs.).

Mohamed Elsafi, et al., "A novel epoxy resin-based composite with zirconium and boron oxides: an investigation of photon attenuation", Crystals, 12(10), Sep. 27, 2022, p. 1370 (11 pgs.).

* cited by examiner

RADIATION SHIELDING NANOCOMPOSITE

BACKGROUND

Technical Field

The present disclosure is directed to zirconia-based nanocomposite material for shielding radiation.

Background

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Radiation is a type of energy that travels in the form of waves and/or particles and is part of our everyday environment. People are exposed to radiation from cosmic rays, as well as from radioactive materials found in the soil, water, food, air and also inside the body. Radiation releases energy in a variety of forms, such as waves or particles. Ionizing radiation is a form of radiation that is worrisome because it has sufficient energy to dislodge tightly bound electrons from atoms, resulting in substantial harm to biological tissues. Gamma rays are a type of ionizing radiation that is very dangerous because of their capacity to deeply permeate materials, presenting a significant health hazard by inducing DNA harm, radiation illness, and potentially cancer in living beings.

It is critical to understand the rationale for applying shielding measures to protect against radiation. Utilizing high-density and thick materials for shielding significantly reduces radiation penetration, thereby limiting its negative impacts. High-density shielding materials are widely used in numerous applications because they are effective in blocking or reducing radiation and other hazardous particles. Lead is a metal that possesses beneficial characteristics such as exceptional shielding qualities and low cost. However, conventional lead-based radiation shielding materials pose significant health and environmental risks due to their inherent toxicity. Lead exposure can lead to various adverse effects, including neurological damage, reproductive issues, and environmental contamination. Additionally, the high density and weight of lead-based materials make them cumbersome and challenging to transport and install, particularly in applications where weight considerations are crucial, such as aerospace or medical facilities. In order to reduce adverse effects, disposal and management pose challenges. Medical patients and workers often wear radiation-shielding garments to safeguard themselves from direct and secondary radiation during diagnostic imaging.

Thus, there is a need to provide a non-toxic, lightweight alternative to lead-based shielding materials while offering superior radiation shielding capabilities. Non-lead shielding materials can absorb or block radiation. They are made by mixing heavy metals with binders and additives that have attenuating properties [N. J. AbuAlRoos, N. A. Baharul Amin, and R. Zainon, Conventional and new lead-free radiation shielding materials for radiation protection in nuclear medicine: A review. *Radiation Physics and Chemistry*, 2019. 165: p. 108439; L. Gilys, E. Griškonis, P. Griškevičius, and D. Adlienė, Lead Free Multilayered Polymer Composites for Radiation Shielding. *Polymers*, 2022. 14 (9): p. 1696.]. Consequently, there is an increasing demand for alternate shielding materials that can provide comparable or better shielding properties while reducing these disadvantages.

Accordingly, it is one object of the present disclosure to provide a non-toxic, lightweight alternative to lead-based shielding materials while offering superior radiation shielding capabilities. The present disclosure is directed to a metal-oxide doped zirconia-based nanomaterial that exhibits not only enhanced thermal stability, chemical resistance but also improved attenuation of gamma and X-ray radiation.

SUMMARY

In an exemplary embodiment, a nanocomposite having radiation shielding property is disclosed. The nanocomposite consists of a zirconia matrix and a metal oxide dispersed in the zirconia matrix and selected from the group consisting of bismuth oxide and tungsten oxide. The nanocomposite is in the form of nanoparticles having an average size of 5-25 nm. The linear attenuation coefficient of the nanocomposite is higher than the linear attenuation coefficient of pure zirconia for gamma-rays having energies of 0.059 MeV to 0.662 MeV. The nanocomposite comprises, based on a total weight of the nanocomposite, 40-60 wt. % of Zr, 20-30 wt. % of O, and 20-30 wt. % of Bi or W.

In some embodiments, the metal oxide is bismuth oxide.

In some embodiments, the nanoparticles form aggregates that include needle-shaped structures disposed on outer surfaces of the aggregates and the needle-shaped structures have an average aspect ratio of 3-10.

In some embodiments, the nanoparticles have an average size of 10-16 nm, the aggregates have an average size of 2-20 µm, the needle-shaped structures have an average length of 0.5-2.0 µm, and the needle-shaped structures have an average width of 50-600 nm.

In another exemplary embodiment, the nanocomposite consists of, based on a total weight of the nanocomposite: 45-55 wt. % of Zr; 22-28 wt. % of O; and 20-30 wt. % of Bi.

In some embodiments, the nanocomposite consists of, based on the total weight of the nanocomposite: 48 wt. % of Zr; 25 wt. % of O; and 27 wt. % of Bi.

In some embodiments, a linear attenuation coefficient of the nanocomposite is about 20%-30% higher than a linear attenuation coefficient of pure zirconia for gamma-rays having energies of 0.059 MeV to 0.662 MeV.

In some embodiments, the metal oxide is tungsten oxide.

In another exemplary embodiment, the nanocomposite consists of, based on a total weight of the nanocomposite: 45-55 wt. % of Zr; 25-30 wt. % of O and 20-30 wt. % of W.

In some embodiments, the nanocomposite consists of, based on the total weight of the nanocomposite: 49 wt. % of Zr; 27 wt. % of O and 24 wt. % of W.

In some embodiments, a linear attenuation coefficient of the nanocomposite is about 9%-12% higher than a linear attenuation coefficient of pure zirconia for gamma-rays having energies of 0.059 MeV to 0.662 MeV.

In some embodiments, the nanoparticles have an average size of 15-22 nm and the nanoparticles form aggregates having an average size of 1-4 µm.

In some embodiments, the nanocomposite does not include a polymer, ferrite, barium oxide, boron oxide, manganese oxide or yttrium.

In some embodiments, the metal oxide is not functionalized by a polymer.

In another exemplary embodiment, the radiation shield comprise of the nanocomposite.

In some embodiments, the radiation shield consists of an enclosure shell enclosing a core space that is filled with the nanocomposite. The core space has a plate-like shape having a thickness of 0.1-3 cm and lateral dimensions of 50-200 cm and the enclosure shell has a thickness of 1-5 cm enclosing the core space.

In another exemplary embodiment, a method of shielding a person, animal, tissue or another biological entity from ionizing radiation is disclosed. The method requires placing an article comprising the nanocomposite between the biological entity and a source of ionizing radiation.

In some embodiments, a method of manufacturing a nanocomposite is disclosed. The method consists of synthesizing zirconium oxychloride from a zircon mineral via alkaline fusion and crystallization. The process further requires forming a gel of zirconium oxychloride and a metal oxide selected from the group consisting of bismuth oxide and tungsten oxide via a sol-gel process. The next step involves subjecting the gel to a solvent exchange process to remove water, and an organic solvent is added. The gel is dried and calcinated at a temperature of 700-1000° C. for 1-10 hours to form a zirconia-based nanocomposite containing the metal oxide.

In some embodiments, the organic solvent consists of ethanol and the gel is calcinated at 800° C. for 3 hours.

In another exemplary embodiment, the sol-gel process is disclosed. It consists of forming a sol of colloidal nanoparticles by mixing the zirconium oxychloride with distilled water, followed by combining the sol with a gelatin solution and the metal oxide to form a mixture. Ammonia is added to the mixture to induce hydrolysis and form the gel.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings.

DETAILED DESCRIPTION

Figure 1A:
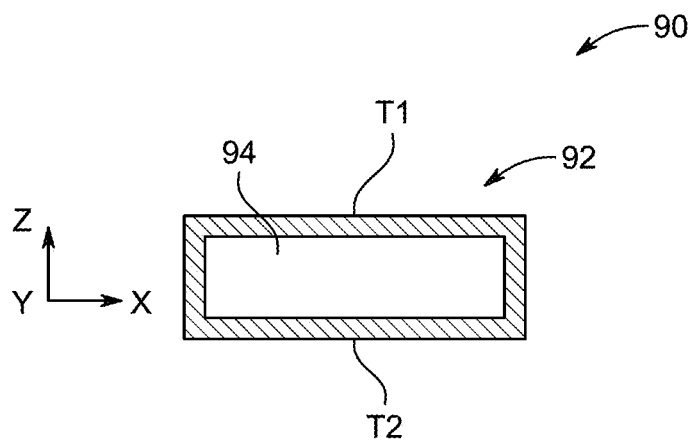
FIG. 1A shows a cross-sectional view of a radiation shield, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

According to aspects of the disclosure, a nanocomposite includes a zirconia matrix. The zirconia matrix is a structural or functional material wherein zirconium dioxide ($ZrO_2$) acts as the main component, providing a continuous phase that supports and binds to one or more other materials, such as particles, fibers, and/or fillers, within a composite structure. The nanocomposite further includes a metal oxide dispersed in the zirconia matrix. The metal oxide may or may not be functionalized by a polymer. The metal oxide may include, but is not limited to, bismuth oxide, tungsten oxide, gadolinium oxide ($Gd_2O_3$), thallium oxide ($Tl_2O_3$), iron oxide ($Fe_2O_3$), cerium oxide ($CeO_2$) or any combinations thereof. Preferably, the metal oxide includes bismuth oxide, tungsten oxide or both. In some embodiments, the nanocomposite includes bismuth oxide-doped zirconia (Bi—$ZrO_2$) or tungsten oxide-doped zirconia (W—$ZrO_2$). Note that in the present disclosure the terms Bi—$ZrO_2$ and $BiO_2$—$ZrO_2$ are used interchangeably while the terms W—$ZrO_2$ and $WO_3$—$ZrO_2$ are used interchangeably.

In some embodiments, the nanocomposite includes 40-60 wt. % of Zr, more preferably 45-55 wt. % of Zr, and yet more preferably about 48-49 wt. % of Zr; 20-30 wt. % of O, more preferably 22-28 wt. % of O; and 20-30 wt. % of Bi, more preferably 25-30 wt. % of Bi, and yet more preferably about 27 wt. % of Bi, each based on the total weight of the nanocomposite. In some embodiments, the nanocomposite includes 45-55 wt. % of Zr, more preferably 46-50 wt. % of Zr, and yet more preferably about 48-49 wt. % of Zr; 22-28 wt. % of O, preferably 24-26 wt. %, preferably about 25 wt. % of O; and 20-30 wt. % of Bi, more preferably 25-30 wt. % of Bi, and yet more preferably about 27 wt. % of Bi, each based on the total weight of the nanocomposite.

In some embodiments, the nanocomposite includes 40-60 wt. % of Zr, more preferably 45-55 wt. % of Zr, and yet more preferably about 48-49 wt. % of Zr; 20-30 wt. % of O, more preferably 22-28 wt. % of O; and 20-30 wt. % of W, preferably 20-25 wt. % of W, and more preferably about 24 wt. % of W, each based on the total weight of the nanocomposite. In some embodiments, the nanocomposite includes 45-55 wt. % of Zr, more preferably 46-50 wt. % of Zr, and yet more preferably about 48-49 wt. % of Zr; 25-30 wt. % of O, more preferably 26-29 wt. % of O, and yet more preferably about 25-27 wt. % of O; and 20-30 wt. % of W, more preferably 22-26 wt. % of W, and yet more preferably 24 wt. % of W; each based on the total weight of the nanocomposite.

The nanocomposite may optionally include a polymer, ferrite, barium oxide, boron oxide, manganese oxide, yttrium or any combinations thereof. Alternatively, the nanocomposite may not include a polymer, ferrite, barium oxide, boron oxide, manganese oxide, yttrium or any combinations thereof.

The nanocomposite can be in the form of nanoparticles including zirconia particles and dopant particles such as particles of the aforementioned metal oxide. The nanoparticles can have various morphological shapes, such as nanowires, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanofloweres, etc. and mixtures thereof. Alternatively, the nanocomposite can be in the form of a zirconia matrix and one or more dopant materials (e.g. the aforementioned metal oxide) dispersed within the zirconia matrix.

In some embodiments, the zirconia matrix, including tungsten oxide, has an average size of 15-22 nm, preferably 17-20 nm, preferably about 18 nm. The nanoparticles form aggregates having an average size of 0.5-8 μm, preferably 1-4 μm, preferably about 2 μm.

In some embodiments, the nanocomposite, including bismuth oxide, has an average size of preferably 5-20 nm, preferably 10-16 nm, preferably 11-15 nm, preferably about 13 nm. The nanoparticles form aggregates that include needle-shaped structures disposed on outer surfaces of the aggregates. The aggregates have an average size of 1-25 μm, preferably 2-20 μm, preferably 5-15 μm, preferably 7-12 μm. The needle-shaped structures have an average length of 0.1-5 μm, preferably 0.5-2.0 μm, preferably 1-1.5 μm, and an average width of 25-800 nm, preferably 50-600 nm, preferably 100-400 nm, preferably 200-300 nm, and an average aspect ratio of 2-15, preferably 3-10, preferably 5-8, preferably 6-7.

The nanocomposite of the present disclosure can be used in a radiation shield 90. The radiation shield 90 (see FIG. 1A) includes an enclosure shell 92. In some embodiments, the enclosure shell includes a top end 'T1' and a bottom end 'T2', where the top end 'T1' and the bottom end 'T2' define a volume between. The enclosure shell 92 encloses a core space 94 filled with the nanocomposite. The core space 94 has a plate-like shape with a thickness of 0.1-3 cm, preferably 0.5-2 cm, preferably 1.0-1.5 cm in the Z direction, and lateral dimensions of 50-200 cm, preferably 75-175 cm, preferably 100-150 cm in the XY plane. The enclosure shell 92 has a thickness of 1-5 cm, preferably 2-4 cm, preferably 2.5-3.5 cm, enclosing the core space 94. In some embodiments, the geometry of the core space 94 may include, but is not limited to, a circular, polygonal, triangular, and rectangular shape in the XY plane. In some embodiments, the enclosure shell 92 is configured to be corrosion resistant and weatherproof, manufactured using materials including, but may not be limited to, steel, concrete, tungsten, polyethylene, boron-carbide, polymer-based composites mixed with metals or ceramics, alloys, etc. However, in some embodiments, the dimensional specifications and constructional details of the radiation shield 90 may differ from the above described, depending upon the area of employment of the enclosure shell. That is, the dimensions discussed in this disclosure are merely for illustrative purposes and are not limiting.

The linear attenuation coefficient of the nanocomposite is higher than the linear attenuation coefficient of pure zirconia for gamma rays having energies of at least 0.059 MeV to 0.662 MeV. The linear attenuation coefficient measures how a material absorbs or scatters radiation per unit thickness of the material. In some embodiments, the nanocomposite including 48 wt. % of Zr; 25 wt. % of O; and 27 wt. % of Bi, each based on the total weight of the nanocomposite, has a linear attenuation coefficient that is about 20%-30% higher than a linear attenuation coefficient of pure zirconia for gamma-rays having energies of 0.059 MeV to 0.662 MeV. Bismuth oxide incorporation enhances the radiation absorption capacity of zirconia, resulting in improved shielding properties. Additionally, bismuth oxide-impregnated zirconia exhibits excellent thermal stability and resistance to chemical degradation, ensuring long-term performance.

In some embodiments, the nanocomposite, including 49 wt. % of Zr, 27 wt. % of O, and 24 wt. % of W, has a linear attenuation coefficient of about 9%-12% higher than a linear attenuation coefficient of pure zirconia for gamma-rays having energies of at least 0.059 MeV to 0.662 MeV. Tungsten oxide impregnation enhances radiation shielding capabilities and introduces high-density properties, remarkably attenuating the penetration of gamma and X-ray radiation.

A method of shielding a person, animal, tissue, or other biological entity from ionizing radiation includes placing an article, including the nanocomposite, between the biological entity and a source of ionizing radiation. The article may include, but is not limited to, aprons, gamma-ray shielding containers, CT scanner techniques, radiation suits, or building shielding. In some embodiments, the nanocomposite may be provided to the person, animal, tissue, or another biological entity in the form of radioprotective drugs. The article may include the radiation shield 90.

In a preferred embodiment of the present disclosure, the radiation shield 90 contains the metal oxide in a concentrated portion of the zirconia matrix and is not distributed homogeneously in the zirconia matrix. For example, in the radiation shield 90, the zirconia matrix completely fills the core space inside the enclosure shell 92. The long dimension of the plate-like shape includes a layer or a portion of the zirconia matrix having a substantially higher concentration of the metal oxide in comparison to portions of the plate-like shape that are close to the outermost edges thereof. Typically, in this embodiment, the metal oxide is mainly, preferably more than 90% by mass, more than 95% mass or 100% by mass based on the total weight of the metal oxide contained in a layer representing from 0.05 to 0.3 times, preferably 0.1 to 0.15 times the total thickness of the plate-like shape which is most preferably disposed in the middle of the thickness of the plate-like shape thereby providing a sandwich-type symmetrical structure. The overall composition of the material that occupies the core space 94 of the enclosure shell 92 conforms with the compositions described here; however, the metal oxide is preferably concentrated in only a portion of the plate-like shape.

Figure 1B:
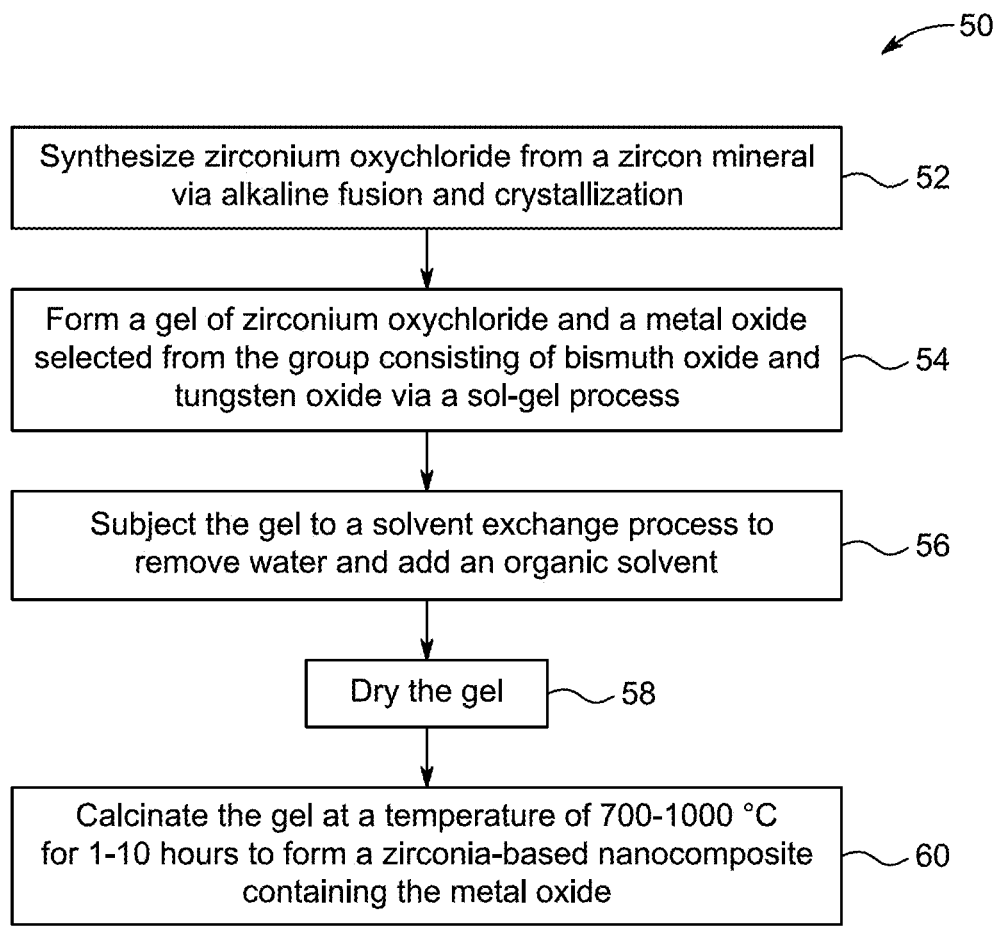
FIG. 1B is a schematic diagram of a method of preparing a nanocomposite (e.g. zirconia-based nanomaterial), according to certain embodiments.

FIG. 1B illustrates a schematic flow chart of a method 50 of manufacturing a nanocomposite. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes synthesizing zirconium oxychloride from a zircon mineral via alkaline fusion and crystallization. The alkali fusion process involves the fusion (melting) of a zirconium mineral with a strong alkaline substance, such as sodium hydroxide (NaOH) or potassium hydroxide (KOH), at high temperatures. Optionally, zirconium oxychloride can be synthesized through acid digestion, microwave digestion, hydrofluoric acid digestion, fusion with lithium borate, and oxidative fusion. In an embodiment, the zircon mineral is grounded into a fine powder (to reduce the particle size) before the alkali fusion. The weight ratio of the zircon material (zircon powder) to the alkaline substance, sodium hydroxide, is about 1:5 to 5:1, preferably 1:4 to 4:1, preferably 1:3 to 3:1, preferably 1:2 to 2:1, preferably 1:1.25. This process is carried out at a high temperature of about 500-100° C., preferably 600-900° C., preferably 700-800° C., preferably about 700° C. in an electric furnace for 3 hours to enable fusion and reaction. In some embodiments, the electric furnace may include, but is not limited to, a laboratory muffle furnace, electric resistance furnace, electric kiln, induction furnace, and rotary electric furnace. The zircon material is melted when heated to this temperature, after which it is cooled for the crystallization process. The crystals can be separated through filtration and air-dried at room temperature, producing zirconium oxychloride ($ZrOCl_2 \cdot xH_2O$).

At step 54, the method 50 includes forming a gel of zirconium oxychloride and a metal oxide selected from the group consisting of bismuth oxide and tungsten oxide via a sol-gel process. The sol-gel method is a chemical process used to synthesize materials by transitioning from a liquid 'sol' (a colloidal suspension of solid particles in a liquid) to a solid 'gel' (a network of interconnected particles) through hydrolysis and condensation reactions. This method allows for fabricating materials with control over their composition, structure, and properties at relatively low temperatures. The sol-gel process is performed by initially forming a sol of colloidal nanoparticles by mixing the zirconium oxychloride with distilled water. The sol-gel process further includes combining the sol with a gelatin solution and the metal oxide to form a mixture. Ammonia is added to the mixture to induce hydrolysis and form the gel.

At step 56, the method 50 includes subjecting the gel to a solvent exchange process to remove water and add an organic solvent. Excess water is removed, and ethanol is added to remove impurities and enhance the purity of the gel. The solvent exchange process is a method of sequentially replacing one solvent in a solution with another, typically through techniques such as evaporation, filtration, or diffusion, to modify the solvent environment around solutes, enhance material properties, or facilitate subsequent processing steps. In some embodiments, the organic solvent may include, but is not limited to, tetrahydrofuran, ethyl acetate, dimethylformamide, acetonitrile, acetone, dimethyl sulfoxide, nitromethane, propylene carbonate, ethanol, formic acid, n-butanol, methanol, benzene, cyclohexane, ethanol, methanol, acetone, ethyl acetate, dichloromethane, toluene, and diethyl ether. In a preferred embodiment, the organic solvent includes ethanol.

At step 58, the method 50 includes drying the gel. In some embodiments, the drying can be performed by using heating appliances such as ovens, microwaves, autoclaves, hot plates, heating mantles and tapes, oil baths, salt baths, sand baths, air baths, hot-tube furnaces, and hot-air guns. In a preferred embodiment, the drying is done naturally.

At step 60, the method 50 includes calcinating the gel at a temperature of 700-1000° C. for 1-10 hours to form a zirconia-based nanocomposite containing the metal oxide. In a preferred embodiment, the gel is calcinated at 800° C. for 3 hours. The calcination is carried out by heating the gel to a high temperature, under a restricted supply of ambient oxygen. This is performed to remove impurities or volatile substances and to incur thermal decomposition. Typically, the calcination is carried out in a furnace, preferably equipped with a temperature control system, which may provide a heating rate of up to 50° C./min, preferably up to 40° C./min, preferably up to 30° C./min, preferably up to 20° C./min, preferably up to 10° C./min, preferably up to 5° C./min to a temperature of about 500-100° C., preferably 600-900° C., preferably 700-800° C., preferably about 800° C. for 1-5 hours, preferably 2-4 hours, preferably 3 hours. Calcination eliminates organic components and facilitates the formation of a highly crystalline zirconia structure and stable mineral oxide layers.

The present disclosure shows the comparative shielding performance of the nanocomposite with regard to lead-based radiation shielding materials. The nanocomposite of the present disclosure is lightweight and non-toxic as compared to prior art shielding materials such as lead-based radiation shielding materials. The nanocomposite exhibits improved thermal stability and resistance to chemical degradation. In one embodiment, the lead's equivalent thickness to 1 cm of pure lead is 2.00 cm for the bismuth oxide-doped zirconia nanocomposite at a gamma-ray energy of 1.252 MeV. In another embodiment, the lead's equivalent thickness to 1 cm of pure lead is 2.11 cm for the tungsten oxide-doped zirconia nanocomposite at a gamma-ray energy of 1.252 MeV.

EXAMPLES

The following examples demonstrate zirconia-based nanocomposite as described herein. The examples are provided solely for illustration and are not to be construed as limitations of the present disclosure, as many variations are possible without departing from the spirit and scope of the present disclosure.

Example 1: Synthesis of Zirconium Oxychloride ($ZrOCl_2 \cdot xH_2O$)

The zircon mineral was ground into a fine powder and then reacted with an alkali fusion process. A specific amount of zircon powder was mixed with sodium hydroxide in a weight ratio 1:1.25. The mixture was placed in a heat-resistant stainless-steel container and exposed to a constant temperature of 700° C. in an electric furnace for 3 hours to ensure complete fusion and reaction. Once cooled naturally, the contents were transferred and dissolved in distilled water, with the undissolved materials being rinsed multiple times. The undissolved materials were collected via filtration and left to dry naturally. Subsequently, they were dissolved in concentrated hydrochloric acid at a temperature of 90° C. The resulting precipitate was allowed to settle and crystallize by naturally cooling. The crystals were then separated through filtration and air-dried at room temperature, resulting in the production of zirconium oxychloride ($ZrOCl_2 \cdot xH_2O$). In the sol-gel method, zirconium oxychloride is the starting material. It is mixed with distilled water to create a sol that includes a stable mixture of colloidal nanoparticles. This sol is then combined with a gelatin solution, and hydrolysis is achieved by adding an ammonia solution. The resulting gel containing zirconium is subjected to a solvent exchange process, where excess water is removed, and ethanol is added to eliminate impurities and enhance the purity of the end product.

Example 2: Synthesis of Bismuth Oxide-Doped Zirconia Nanoparticles (Bi—$ZrO_2$) and Tungsten Oxide-Doped Zirconia Nanoparticles (W—$ZrO_2$)

Figure 2:
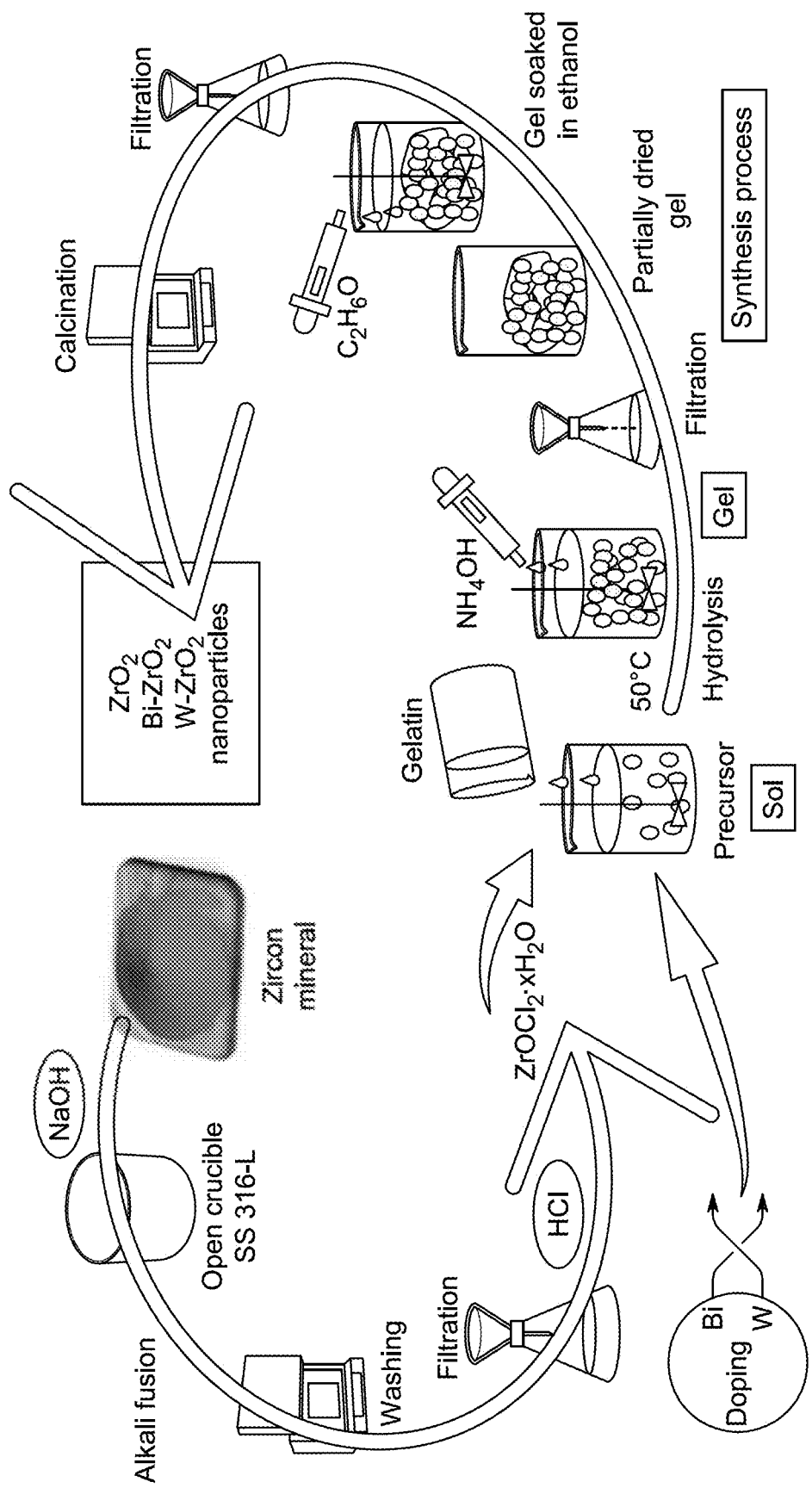
FIG. 2 is schematic representation of a sol-gel synthesis process for producing a zirconia-based nanomaterial, utilizing a natural zircon mineral as a starting raw material, according to certain embodiments.

To synthesize bismuth oxide-doped zirconia nanoparticles (Bi—$ZrO_2$), sodium bismuthate is added to the initial zirconium oxychloride sol and mixed thoroughly. Similarly, to synthesize tungsten oxide-doped zirconia nanoparticles (W—$ZrO_2$), sodium tungstate is added to the initial zirconium oxychloride sol and thoroughly mixed. The resulting gels are then calcined at a high temperature to eliminate organic components and facilitate the formation of highly crystalline zirconia structures and stable mineral oxide layers. The subsequent step involves calcination, which is carried out in an electric furnace at a temperature of 800° C. for 3 hours. Calcination eliminated organic components and facilitated the formation of a highly crystalline zirconia structure and stable mineral oxide layers. A schematic diagram of the sol-gel method for synthesizing zirconia-based nanomaterials, starting with zirconium mineral is depicted in FIG. 2.

Example 3: X-Ray Diffraction (XRD) Analysis and Characterizations

Figure 3:
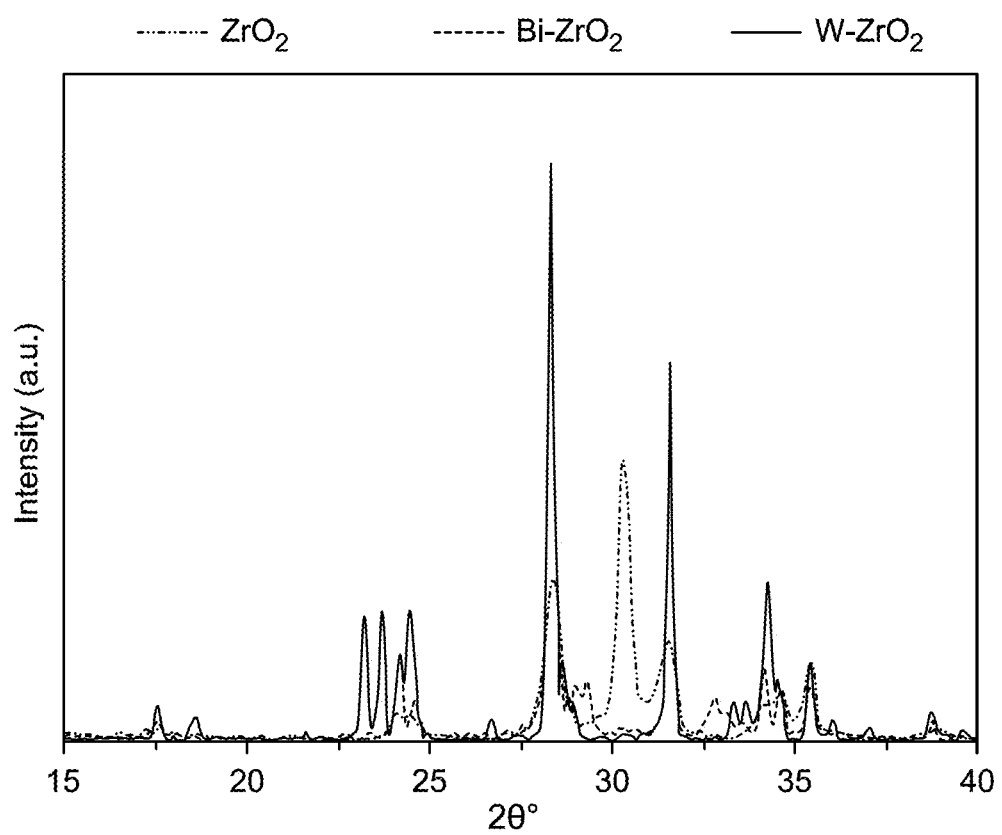
FIG. 3 shows comparative X-ray diffraction patterns of zirconia-based nanomaterials (e.g. $ZrO_2$, Bi—$ZrO_2$, and W—$ZrO_2$), according to certain embodiments.

The XRD analysis conducted on the zirconia-based nanocomposites revealed the existence of distinct phases in each sample. Specifically, the second sample (Bi—$ZrO_2$) exhibited the presence of bismuth oxide, while the third sample (W—$ZrO_2$) showed the presence of tungsten oxide. Conversely, the first sample ($ZrO_2$) demonstrated the absence of any additional oxides. This proves that including dopants in the manufacturing process had a positive impact. Interestingly, the types and quantities of additional materials employed as precursors in manufacturing resulted in unique phase compositions for each sample. FIG. 3 presents the enlarged XRD patterns of the samples to visually illustrate the variation in peak positions and intensities.

Figure 4A:
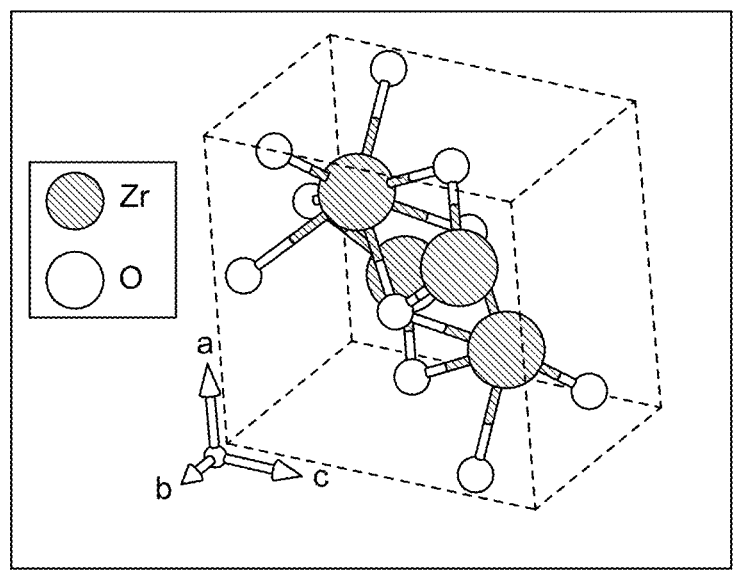
FIG. 4A shows a ball-and-stick representation of the monoclinic zirconia ($ZrO_2$) crystal structure in the unit cell, exhibiting space group P21/c1, according to certain embodiments.
Figure 4B:
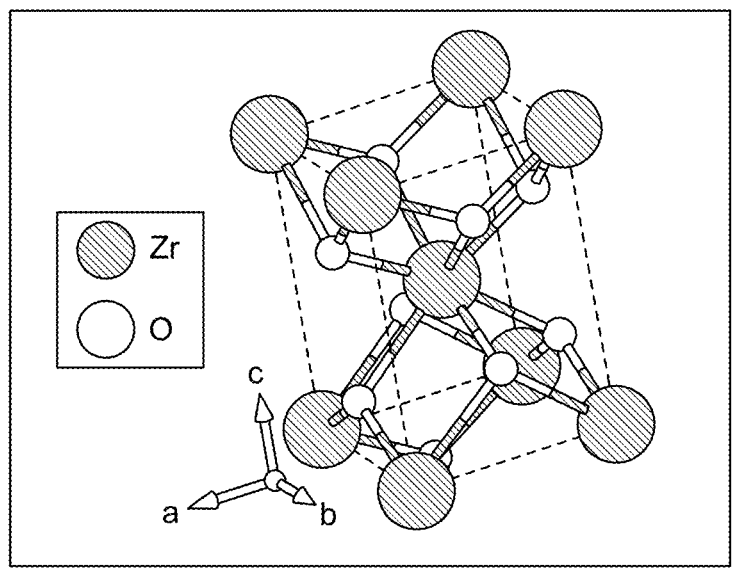
FIG. 4B shows a ball-and-stick representation of the tetragonal zirconia ($ZrO_2$) crystal structure in the unit cell, exhibiting space group P42/nmc, according to certain embodiments.
Figure 4C:
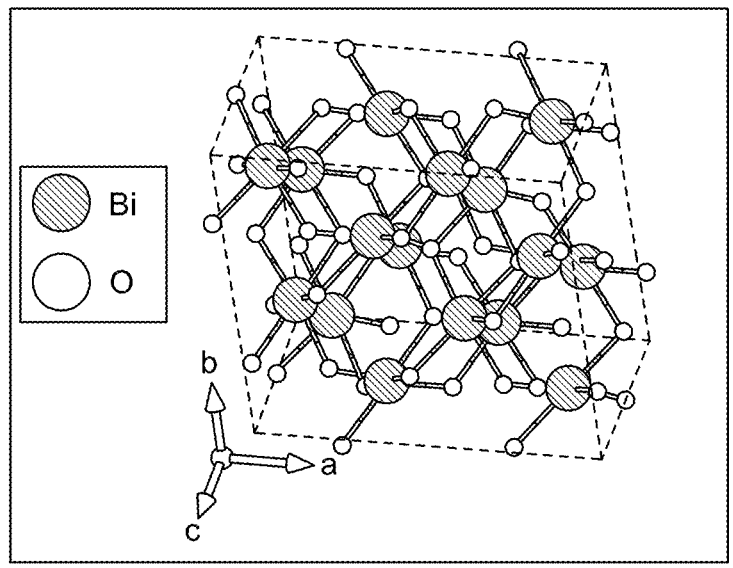
FIG. 4C shows a ball-and-stick representation of the tetragonal bismuth oxide ($Bi_2O_3$) crystal structure in the unit cell, exhibiting space group P-4b2, according to certain embodiments.
Figure 4D:
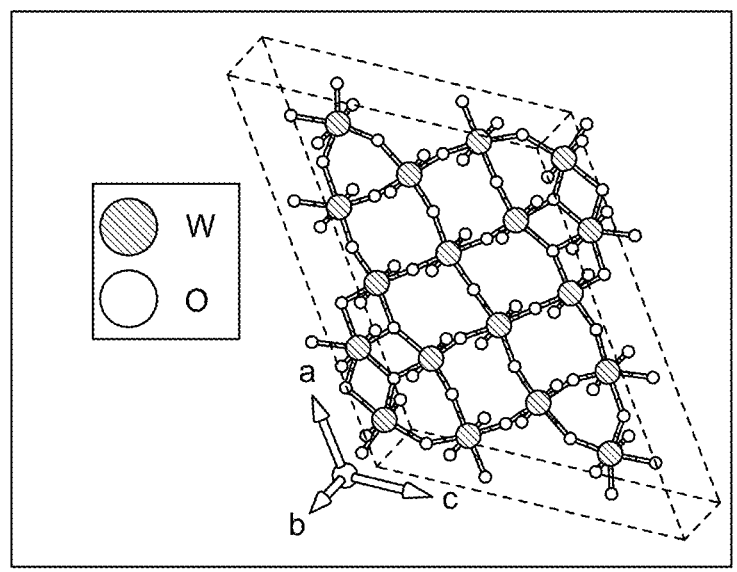
FIG. 4D shows a ball-and-stick representation of the monoclinic tungsten oxide ($WO_3$) crystal structure in the unit cell, exhibiting space group P12/m1, according to certain embodiments.

Zirconia's crystal structure in the monoclinic system, which is in space group P 121/c 1, shows a unique arrangement of its atoms (FIG. 4A). In the P42/nmc space group, zirconia adopts a tetragonal crystal structure. In this structure, oxygen atoms form a cubic, close-packed arrangement, while zirconium atoms occupy half of the octahedral voids. It is worth mentioning that zirconia in the tetragonal system can undergo a phase transformation to a monoclinic structure, thereby altering its physical and chemical properties (FIG. 4B). In the tetragonal system, bismuth oxide has a unique crystal structure with the space group p-4 b 2. This arrangement creates a three-dimensional network of oxygen atoms with bismuth atoms situated at the center of each tetrahedron, resulting in the tetragonal symmetry of bismuth oxide. The tetragonal system and the specific space group p-4 b 2 contribute to the special properties of bismuth oxide, such as its piezoelectric and ferroelectric behavior (FIG. 4C). Tungsten oxide reveals a crystal structure in the monoclinic system with the space group p 1 2/m 1. Tungsten oxide has special chemical and physical properties because of its monoclinic system and space group p 1 2/m 1. These properties include catalytic activity and the ability to go through redox reactions (FIG. 4D).

Example 4: Scanning Electron Microscopy (SEM) Characterization

Figure 5A:
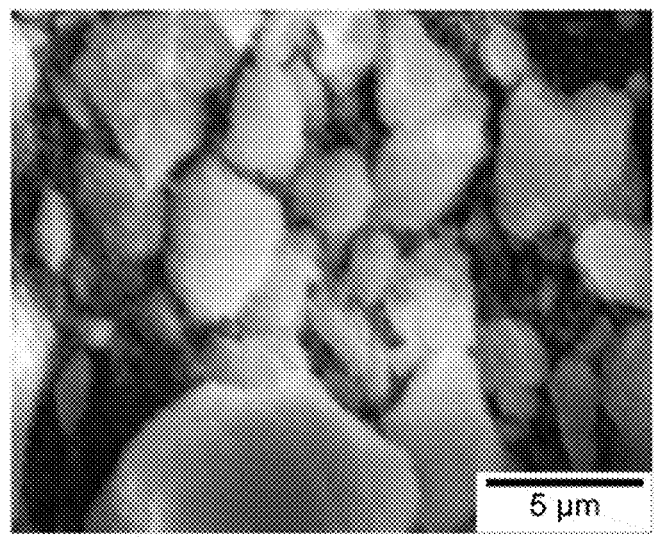
FIG. 5A & FIG. 5D respectively show a scanning electron microscopy (SEM) image and an energy dispersive X-ray spectroscopy (EDX) analysis of $ZrO_2$ nanomaterial, according to certain embodiments.

To evaluate their morphological characteristics and compositional changes, SEM analysis was performed on three zirconia-based nanocomposite samples: $ZrO_2$, Bi—$ZrO_2$, and W—$ZrO_2$. The $ZrO_2$ sample's SEM analysis showed that the zirconia particles were spread out evenly. However, there were some surface irregularities, like cracks and pits, that could affect the material's mechanical properties (FIG. 5A).

Figure 5B:
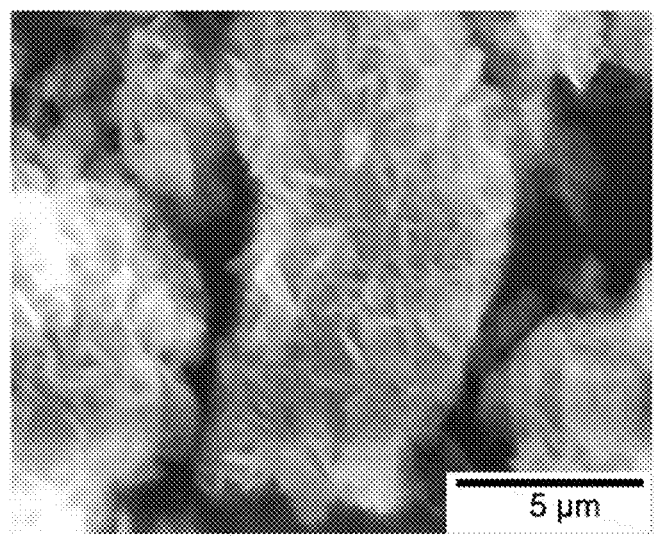
FIG. 5B & FIG. 5E respectively show an SEM image and an EDX analysis of the bismuth-doped zirconia (Bi—$ZrO_2$) nanomaterial, according to certain embodiments.

The Bi—$ZrO_2$ sample showed a higher density of bismuth oxide clusters, affecting the surface roughness and porosity (FIG. 5B). As discussed earlier, in some embodiments, the Bi—$ZrO_2$ sample can be in the form of nanoparticles that form aggregates that include needle-shaped structures disposed on outer surfaces of the aggregates. The aggregates have an average size of 1-25 µm, preferably 2-20 µm, preferably 5-15 µm, preferably 7-12 µm. The needle-shaped structures have an average length of 0.1-5 µm, preferably 0.5-2.0 µm, preferably 1-1.5 µm, and an average width of 25-800 nm, preferably 50-600 nm, preferably 100-400 nm, preferably 200-300 nm, and an average aspect ratio of 2-15, preferably 3-10, preferably 5-8, preferably 6-7.

Figure 5C:
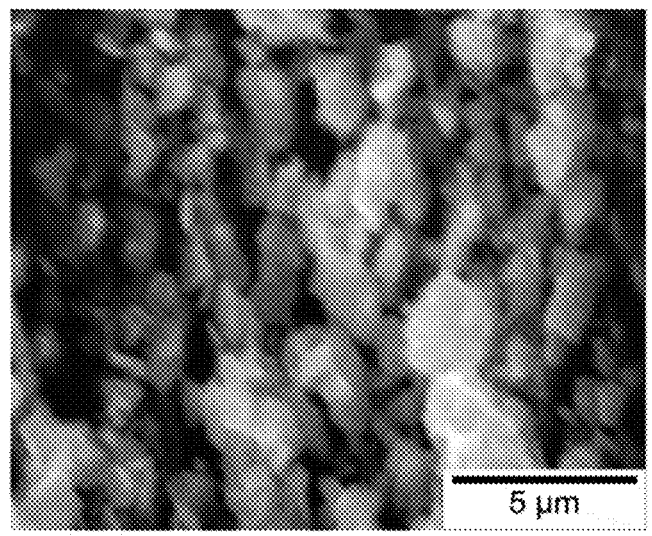
FIG. 5C & FIG. 5F respectively show an SEM image and an EDX analysis of the tungsten-doped zirconia (W—$ZrO_2$) nanomaterial, according to certain embodiments.

The W—$ZrO_2$ sample revealed tungsten oxide nanoparticles leading to agglomerated structures and influencing overall texture and properties (FIG. 5C). As discussed earlier, in some embodiments, the W—$ZrO_2$ sample can be in the form of nanoparticles having an average size of 15-22 nm, preferably 17-20 nm, preferably about 18 nm. The nanoparticles form aggregates having an average size of 0.5-8 µm, preferably 1-4 µm, preferably about 2 µm.

Example 5: Energy Dispersive X-Ray Spectroscopy (EDX) Characterizations

Figure 5D:
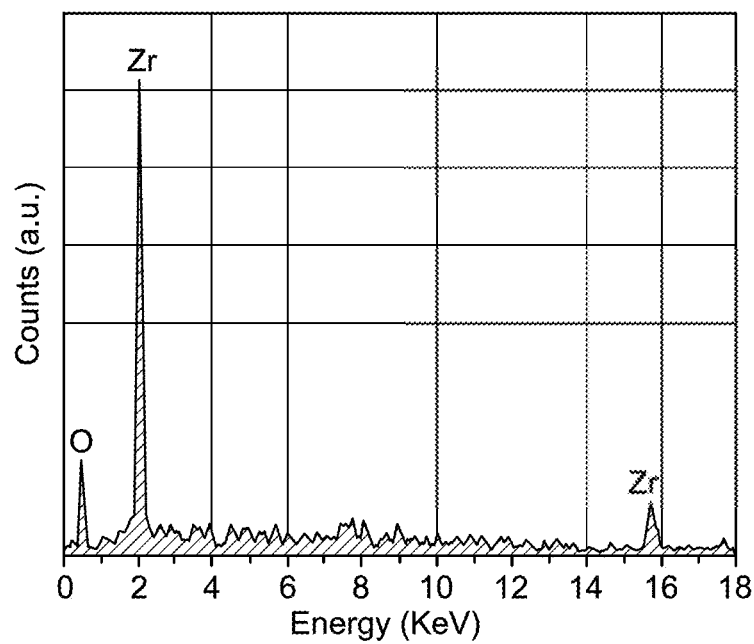
Figure 5E:
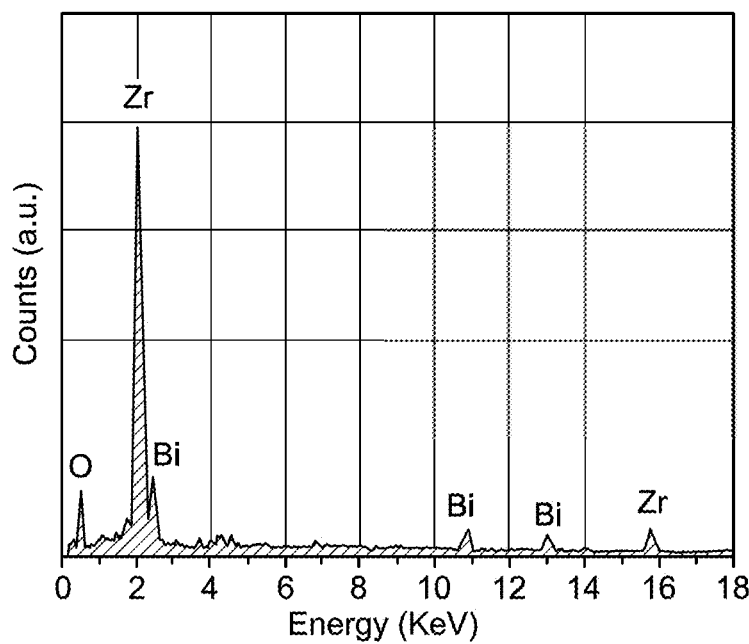
Figure 5F:
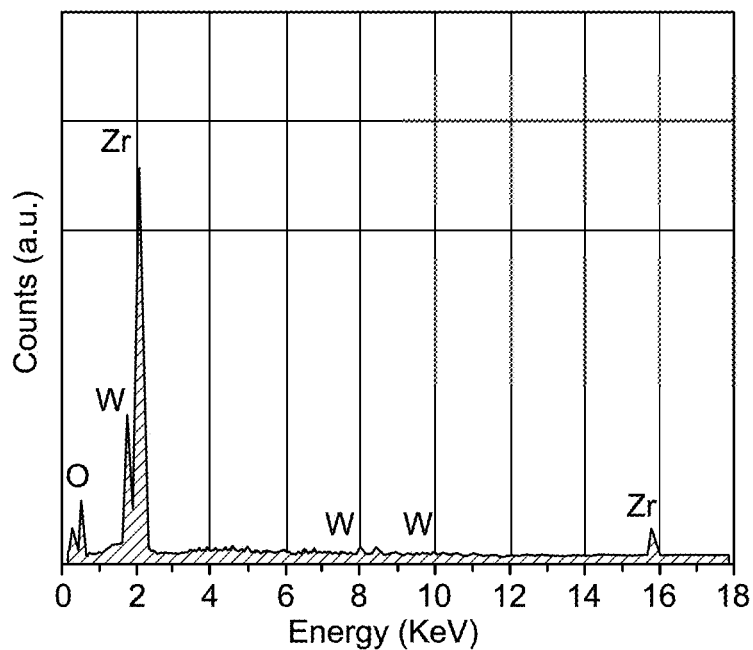

EDX analysis confirmed the primary composition of these samples: $ZrO_2$ predominantly contained zirconium and oxygen with a composition of 68% and 32%, respectively (FIG. 5D); Bi—$ZrO_2$ showed doping with bismuth oxide, evidenced by the presence of bismuth (27%; FIG. 5E) and altered concentrations of zirconium and oxygen (48% and 25%, respectively; FIG. 5E); and W—$ZrO_2$ displayed tungsten activation with the composition ratios of zirconium, oxygen, and tungsten being 49%, 27%, and 24%, respectively (FIG. 5F). These analyses provided critical insights into the elemental distribution and concentration within the composites.

Figure 6A:
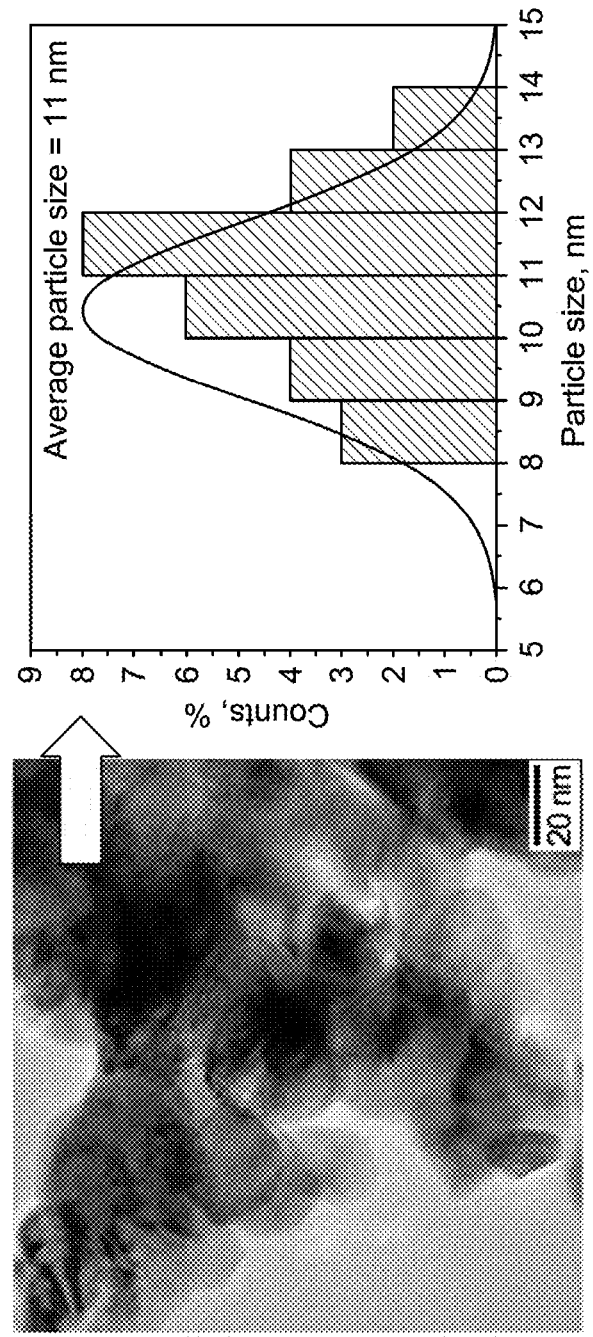
FIG. 6A shows a transmission electron microscopy (TEM) image and a particle size distribution analysis of the $ZrO_2$ nanomaterial, according to certain embodiments.
Figure 6B:
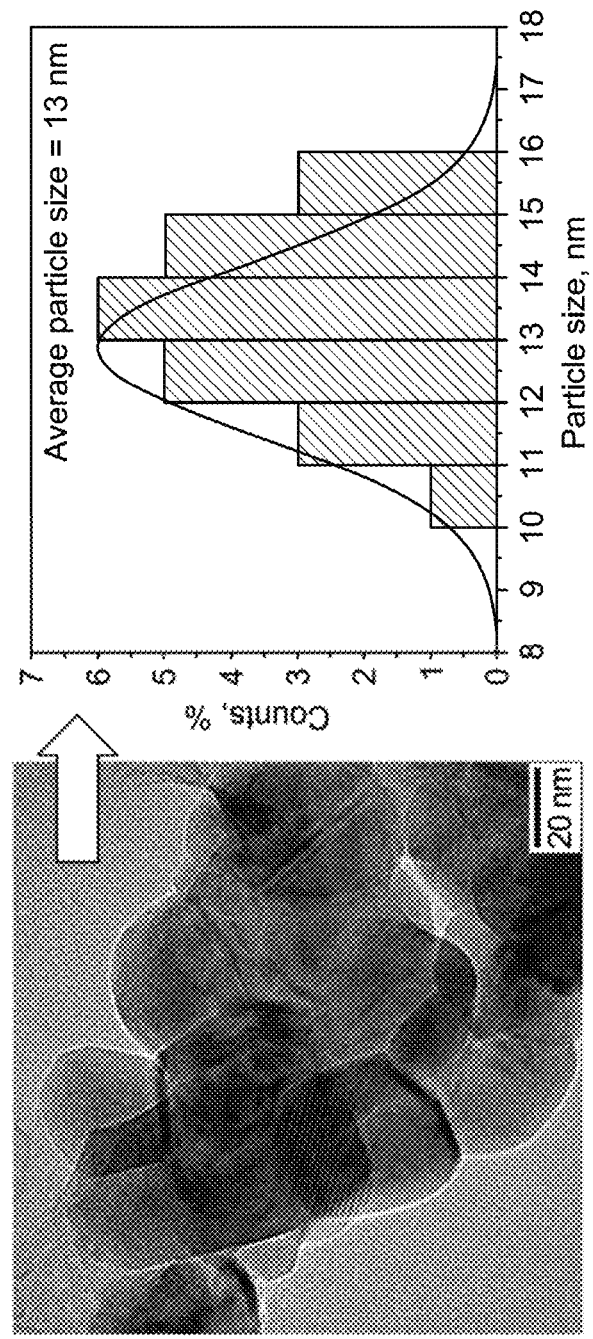
FIG. 6B shows a TEM image and a particle size distribution analysis of the Bi—$ZrO_2$ nanomaterial, according to certain embodiments.
Figure 6C:
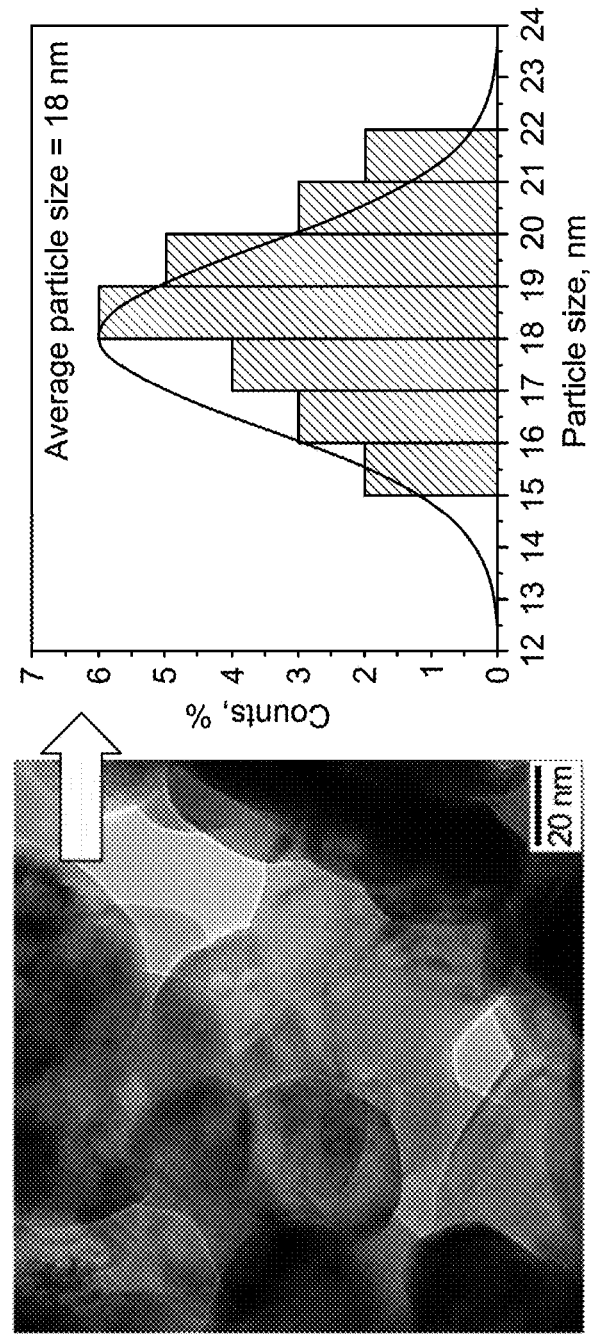
FIG. 6C shows a TEM image and a particle size distribution analysis of the W—$ZrO_2$ nanomaterial, according to certain embodiments.

Example 5: Transmission Electron Microscopy (TEM) Image and Particle Size Distribution Analysis of the Synthesized Zirconia ($ZrO_2$) Nanomaterial Characterization The TEM analysis of the three zirconia-based nanocomposite samples revealed their structural characteristics. The first sample, $ZrO_2$ (FIG. 6A), exhibited high homogeneity with well-distributed zirconia particles, indicating a relatively smooth nanoscale surface. In the second sample, Bi—$ZrO_2$ (FIG. 6B), homogeneity was also high, and particle shape and surface regularity remained well-maintained. The third sample, W—$ZrO_2$ (FIG. 6C), exhibited high homogeneity with uniformly dispersed dopants. Particle shape and surface regularity were well preserved. FIGS. 6A-6C also demonstrate the particle size distribution curves observed in the TEM images of the three samples. The $ZrO_2$ sample exhibited a particle size range of 8 nm to 14 nm, with an average size of 11 nm. Similarly, the Bi—$ZrO_2$ sample had particle sizes ranging from 10 nm to 16 nm, with an average size of 13 nm. The W—$ZrO_2$ sample had particle sizes ranging from 15 nm to 22 nm, with an average size of 18 nm.

Example 6: Impacts of the γ-Photon Energy on the Radiation Shielding Properties

The radiation shielding properties of zirconia-based composites (e.g. $ZrO_2$, Bi—$ZrO_2$, and W—$ZrO_2$) are influenced by gamma-ray photon energy, material thickness, chemical composition, density, and effective atomic number. The nanocomposite samples were evaluated using the Monte Carlo N-Particle transport code (MCNP-5). Variations in these properties are illustrated through changes in key parameters such as the linear attenuation coefficient (u), half-value layer (Δ0.5), and equivalent lead thickness ($\Delta_{eq}$). The data demonstrate enhanced linear attenuation coefficient (u) and improved shielding capabilities upon the addition of bismuth oxide or tungsten oxide. The linear attenuation coefficients of (1) zirconia and bismuth oxide, (2) zirconia and tungsten oxide, (3) pure zirconia, (4) pure bismuth oxide and (5) pure tungsten oxide were obtained. The linear attenuation coefficients were evaluated over the energy interval of 0.03-1.408 MeV which covers photoelectric interactions (FIG. 7A) and Compton scattering interactions (FIG. 7B).

Figure 7A:
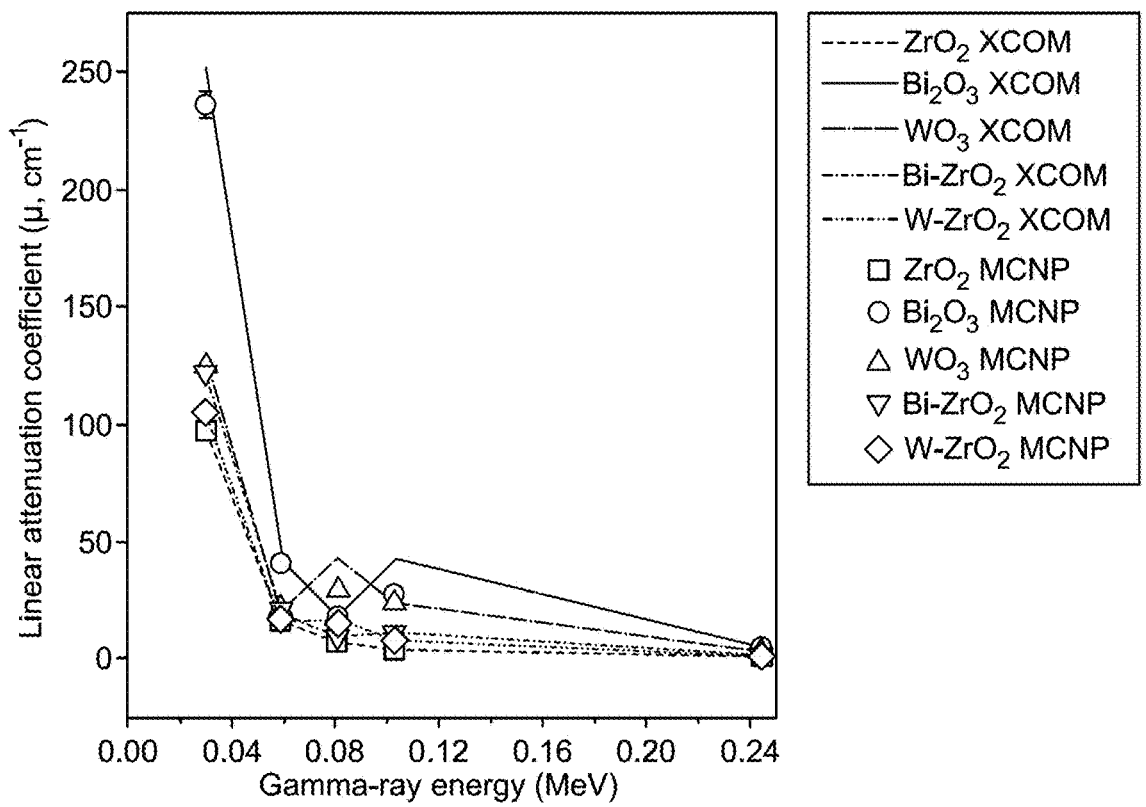
FIG. 7A shows impact of the γ-photon energy of various nanocomposites ($ZrO_2$, $Bi_2O_3$, $WO_3$, Bi—$ZrO_2$, W—$ZrO_2$) on the linear attenuation coefficient, according to certain embodiments.

FIG. 7A shows that the linear attenuation coefficient of bismuth oxide is higher than the linear attenuation coefficient of pure zirconia by 161.5%, 128.6%, and 69.4% at gamma-ray energy of 0.059 MeV, 0.662 MeV, and 1.252 MeV, respectively. The addition of bismuth oxide nanoparticles to zirconia increases the linear attenuation coefficient of pure zirconia by 29.1%, 20.8%, and 9.9% at gamma-ray energies of 0.059 MeV, 0.662 MeV, and 1.252 MeV, respectively.

The linear attenuation coefficient of tungsten oxide is higher than the linear attenuation coefficient of pure zirconia by 35.36, 55.30, and 29.40% at gamma-ray energy of 0.059 MeV, 0.662 MeV, and 1.252 MeV, respectively. The addition of tungsten oxide nanoparticles to zirconia increases the linear attenuation coefficient of pure zirconia by 9.9%, 11.3%, and 4.4% at gamma-ray energies of 0.059 MeV, 0.662 MeV, and 1.252 MeV, respectively.

Figure 7B:
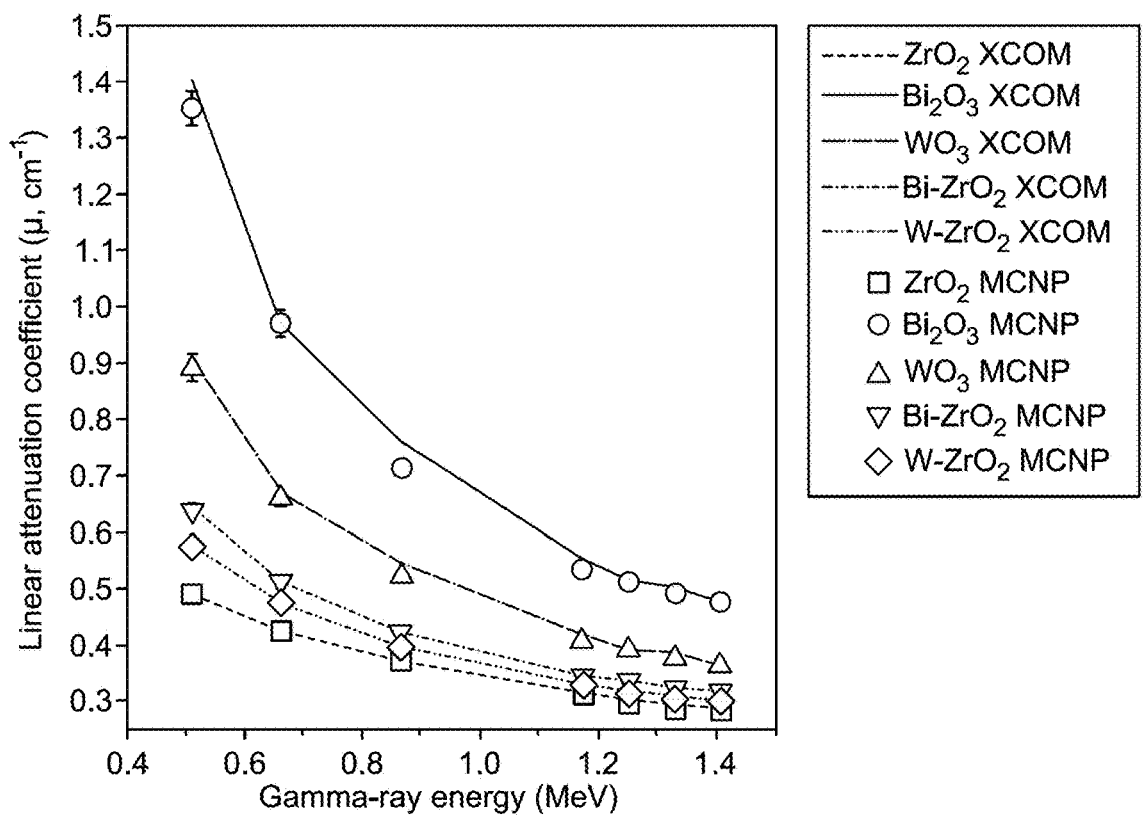
FIG. 7B shows impact of the γ-photon energy of various nanocomposites ($ZrO_2$, $Bi_2O_3$, $WO_3$, Bi—$ZrO_2$, W—$ZrO_2$) on the linear attenuation coefficient, according to certain embodiments.

FIG. 7A shows that u values are highest at the lowest energy (0.03 MeV) and decrease with increasing energy due to photoelectric (PE) and Compton scattering (CS) interactions (FIG. 7B). This decline in u values leads to an increase in the number of transmitted photons, which in turn raises the necessary thickness to attenuate 50% of the original photon number.

The nanocomposite of the present disclosure has potential commercial applications in various industries where radiation shielding is needed, including healthcare, nuclear research, and space exploration. In the healthcare industry, these materials can be utilized in producing radiation-shielding garments, shielding equipment for medical facilities employing radiation therapy or diagnostic imaging, and protective components for personnel working in radiation-intensive environments. In nuclear research, the nanocomposites can be employed as shielding materials in nuclear power plants, research facilities, and radioactive waste management sites, providing enhanced protection against ionizing radiation. These nanocomposites can also benefit space exploration missions, as they can be incorporated into spacecraft components, shielding astronauts and sensitive equipment from the harmful effects of cosmic radiation.

Numerous modifications and variations of the present disclosure are possible in light of the above teachings. Therefore, it is to be understood that within the scope of the appended claims, the invention may be practiced other than as specifically described herein.

The invention claimed is:

1. A nanocomposite, comprising:
   a zirconia matrix; and
   bismuth oxide dispersed in the zirconia matrix, wherein
   the nanocomposite is in the form of nanoparticles having an average size of 10-16 nm,
   the nanoparticles form aggregates that include needle-shaped structures disposed on outer surfaces of the aggregates,
   the aggregates have an average size of 2-20 μm,
   the needle-shaped structures have an average aspect ratio of 3-10,
   the needle-shaped structures have an average length of 0.5-2.0 μm,
   the needle-shaped structures have an average width of 50-600 nm,
   a linear attenuation coefficient of the nanocomposite is higher than a linear attenuation coefficient of pure zirconia for gamma-rays having energies of 0.059 MeV to 0.662 MeV, and
   the nanocomposite comprises, based on a total weight of the nanocomposite,
   40-60 wt. % of Zr,
   20-30 wt. % of O, and
   20-30 wt. % of Bi.

2. The nanocomposite of claim 1, wherein the nanocomposite comprises, based on a total weight of the nanocomposite:
   45-55 wt. % of Zr;
   22-28 wt. % of O; and
   20-30 wt. % of Bi.

3. The nanocomposite of claim 2, wherein the nanocomposite comprises, based on the total weight of the nanocomposite:
   48 wt. % of Zr;
   25 wt. % of O; and
   27 wt. % of Bi.

4. The nanocomposite of claim 3, wherein:
   a linear attenuation coefficient of the nanocomposite is about 20%-30% higher than a linear attenuation coefficient of pure zirconia for gamma-rays having energies of 0.059 MeV to 0.662 MeV.

5. The nanocomposite of claim 1, wherein:
   the nanocomposite does not include a polymer, ferrite, barium oxide, boron oxide, manganese oxide or yttrium.

6. A radiation shield, comprising:
   the nanocomposite of claim 1.

7. The radiation shield of claim 6, further comprising:
an enclosure shell enclosing a core space that is filled with the nanocomposite, wherein
the core space has a plate-like shape having a thickness of 0.1-3 cm and lateral dimensions of 50-200 cm, and
the enclosure shell has a thickness of 1-5 cm enclosing the core space.

8. The nanocomposite of claim 1, wherein:
the average aspect ratio of the needle-shaped structures is 5-8,
the average length of the needle-shaped structures is 1-1.5 µm, and
the average width of the needle-shaped structures is 200-400 nm.

9. The nanocomposite of claim 1, wherein the nanocomposite is obtained by:
synthesizing zirconium oxychloride from a zircon mineral via alkaline fusion and crystallization;
forming a gel of the zirconium oxychloride and the bismuth oxide via a sol-gel process;
subjecting the gel to a solvent exchange process to remove water and add an organic solvent;
drying the gel; and
calcinating the gel to form a zirconia-based nanocomposite containing the bismuth oxide.

10. The nanocomposite of claim 9, wherein:
the calcinating comprises calcinating the gel at a temperature of 800-1000° C. for 1-5 hours.

11. The nanocomposite of claim 9, wherein:
the organic solvent comprises ethanol.

12. A nanocomposite, comprising:
a zirconia matrix; and
tungsten oxide dispersed in the zirconia matrix, wherein
the nanocomposite is in the form of nanoparticles having an average size of 15-22 nm,
the nanoparticles form aggregates having an average size of 1-4 µm,
a linear attenuation coefficient of the nanocomposite is higher than a linear attenuation coefficient of pure zirconia for gamma-rays having energies of 0.059 MeV to 0.662 MeV, and
the nanocomposite comprises, based on a total weight of the nanocomposite,
45-55 wt. % of Zr,
25-30 wt. % of O, and
20-30 wt. % of W.

13. The nanocomposite of claim 12, wherein the nanocomposite comprises, based on the total weight of the nanocomposite:
49 wt. % of Zr;
27 wt. % of O; and
24 wt. % of W.

14. The nanocomposite of claim 13, wherein:
a linear attenuation coefficient of the nanocomposite is about 9%-12% higher than a linear attenuation coefficient of pure zirconia for gamma-rays having energies of 0.059 MeV to 0.662 MeV.

15. The nanocomposite of claim 12, wherein the nanocomposite is obtained by:
synthesizing zirconium oxychloride from a zircon mineral via alkaline fusion and crystallization;
forming a gel of the zirconium oxychloride and the tungsten oxide via a sol-gel process;
subjecting the gel to a solvent exchange process to remove water and add an organic solvent;
drying the gel; and
calcinating the gel at a temperature of 700-1000° C. for 1-10 hours to form a zirconia-based nanocomposite containing the tungsten oxide.

\* \* \* \* \*